US011076260B2

(12) United States Patent
Yoo et al.

(10) Patent No.: US 11,076,260 B2
(45) Date of Patent: Jul. 27, 2021

(54) ELECTRONIC DEVICE AND METHOD FOR SCANNING CHANNEL TO PERFORM LOCATION BASED SERVICE

(71) Applicant: Samsung Electronics Co., Ltd., Suwon-si (KR)

(72) Inventors: Seungmin Yoo, Suwon-si (KR); Daeho Kang, Suwon-si (KR); Yeunwoong Kyung, Suwon-si (KR); Seonik Seong, Suwon-si (KR); Chaeman Lim, Suwon-si (KR); Sungrae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/798,034

(22) Filed: Feb. 21, 2020

(65) Prior Publication Data

US 2020/0288268 A1   Sep. 10, 2020

(30) Foreign Application Priority Data

Mar. 6, 2019   (KR) .................. 10-2019-0025630

(51) Int. Cl.
*H04W 28/02*   (2009.01)
*H04W 4/021*   (2018.01)
(Continued)

(52) U.S. Cl.
CPC ....... *H04W 4/021* (2013.01); *H04W 52/0261* (2013.01); *H04W 72/0453* (2013.01); *H04W 84/12* (2013.01)

(58) Field of Classification Search
CPC . H04W 40/021; H04W 40/20; H04W 52/367; H04W 28/0221; H04W 52/08; H04W 52/10; H04W 52/325; G06F 1/3203
See application file for complete search history.

(56) References Cited

U.S. PATENT DOCUMENTS 9,019,984 B2   4/2015   Grosman et al.
9,357,478 B2   5/2016   Nagaraj
(Continued)

FOREIGN PATENT DOCUMENTS

KR   10-2016-0084112 A   7/2016

OTHER PUBLICATIONS

International Search Report dated May 21, 2020 in connection with International Patent Application No. PCT/KR2020/002233, 8 pages.

*Primary Examiner* — Rafael Pérez-Gutiérrez
*Assistant Examiner* — Xiang Zhang

(57) ABSTRACT

In various embodiments, an electronic device may include a wireless communication module performing WLAN communication, a processor operatively connected to the wireless communication module, and a memory operatively connected to the processor. The processor may receive geofence-related information from a server in response to execution of an application associated with a geofencing service, identify status information of the electronic device, determine at least one channel based on the received geofence-related information and/or the identified status information of the electronic device, and perform a scan function based on the determined at least one channel. Other embodiments are possible.

18 Claims, 15 Drawing Sheets

(51) Int. Cl.
    *H04W 72/04*     (2009.01)
    *H04W 52/02*     (2009.01)
    *H04W 84/12*     (2009.01)

(56) References Cited

U.S. PATENT DOCUMENTS

| | | |
|---|---|---|
| 9,749,800 B2 | 8/2017 | Bansal et al. |
| 10,165,396 B2 | 12/2018 | Jeon et al. |
| 10,171,940 B1 | 1/2019 | Greenberger et al. |
| 2002/0082010 A1* | 6/2002 | Koorapaty ........ H04W 52/0245 455/434 |
| 2005/0075125 A1* | 4/2005 | Bada .................... H04W 48/20 455/525 |
| 2013/0203440 A1 | 8/2013 | Bilange et al. |
| 2014/0179344 A1* | 6/2014 | Bansal ............... H04W 52/0209 455/456.1 |
| 2014/0287751 A1 | 9/2014 | Lee et al. |
| 2015/0002271 A1* | 1/2015 | Lee .................. H04W 52/0216 340/10.1 |
| 2015/0141045 A1* | 5/2015 | Qiu ....................... H04W 4/021 455/456.1 |
| 2015/0161553 A1* | 6/2015 | Eggleston ............. H04W 4/021 705/7.15 |
| 2016/0227478 A1* | 8/2016 | Montemurro ..... H04W 52/0216 |
| 2016/0249315 A1* | 8/2016 | Venkatraman ........ H04W 24/08 |
| 2016/0309294 A1* | 10/2016 | Li .......................... H04W 8/26 |
| 2017/0013558 A1* | 1/2017 | Li ..................... H04W 52/0254 |
| 2018/0049132 A1 | 2/2018 | Gorgenyi et al. |
| 2018/0124643 A1 | 5/2018 | Gupta et al. |
| 2019/0044632 A1* | 2/2019 | Yoon ................... H04B 17/318 |
| 2019/0075504 A1* | 3/2019 | Santhanam ........... H04W 4/022 |

\* cited by examiner

FIG. 7A

| Geofence A | Lat./Long. | WLAN Fingerprint | | | Service Profile | | |
|---|---|---|---|---|---|---|---|
| | | BSSID | RSSI | Channel Index | Range | Latency | Event Type |
| | (37.6, 126.9) | AA:BB:CC:11:22:33 | −60 dBm | 6 | < 15m | < 1min | Entry/Exit |
| | | AA:BB:CC:77:88:99 | −78 dBm | 11 | | | |
| | | AA:BB:CC:44:55:66 | −72 dBm | 48 | | | |

710 — Service Profile table
711 — highlighted "< 1min" cell

FIG. 7B

| Geofence B | Lat./Long. | WLAN Fingerprint | | | Service Profile | |
|---|---|---|---|---|---|---|
| | | BSSID | RSSI | Channel Index | Range | < 15m |
| | (37.7, 126.8) | AA:BB:CC:99:99:99 | -70 dBm | 6 | Latency | < 10min |
| | | AA:BB:CC:00:00:00 | -55 dBm | 9 | | |
| | | AA:BB:CC:44:55:66 | -85 dBm | 48 | Event Type | Entry/Exit |

720 — Service Profile
721 — < 10min

FIG. 8A

| Geofence A | Lat./Long. | WLAN Fingerprint | | |
|---|---|---|---|---|
| | | BSSID | RSSI | Channel Index |
| | [37.6, 126.9] | AA:BB:CC:11:22:33 | -60 dBm | 6 |
| | | AA:BB:CC:77:88:99 | -78 dBm | 11 |
| | | AA:BB:CC:44:55:66 | -72 dBm | 48 |

| | Lat./Long. | WLAN Fingerprint | | |
|---|---|---|---|---|
| Geofence B | (37.7, 126.8) | BSSID | RSSI | Channel Index |
| | | AA:BB:CC:99:99:99 | −70 dBm | 6 |
| | | AA:BB:CC:00:00:00 | −55 dBm | 9 |
| | | AA:BB:CC:44:55:66 | −85 dBm | 48 |

FIG. 8C

| | BSSID | RSSI | Channel Index |
|---|---|---|---|
| 1 | AA:BB:CC:11:22:33 | -65 dBm | 6 |
| 2 | AA:BB:CC:00:00:00 | -78 dBm | 9 |
| 3 | AA:BB:CC:77:88:99 | -80 dBm | 11 |
| 4 | AA:BB:CC:44:55:66 | -70 dBm | 48 |
| 5 | AA:BB:CC:11:22:33 | -75 dBm | 44 |

FIG. 9A

| Geofence A | Lat./Long. | WLAN Fingerprint ||| Service Profile ||
|---|---|---|---|---|---|---|
| | | BSSID | RSSI | Channel Index | Range | < 15m |
| | (37.6, 126.9) | AA:BB:CC:11:22:33 | -60 dBm | 6 | Latency | < 1min |
| | | AA:BB:CC:77:88:99 | -78 dBm | 11 | Event Type | Entry/Exit |
| | | AA:BB:CC:44:55:66 | -72 dBm | 48 | | |

910 — Service Profile
911 — (channel index 48)

FIG. 9B

| Geofence B | Lat./Long. | WLAN Fingerprint | | | Service Profile | | |
|---|---|---|---|---|---|---|---|
| | | BSSID | RSSI | Channel Index | Range | Latency | Event Type |
| | (37.7, 126.8) | AA:BB:CC:99:99:99 | -70 dBm | 6 | < 15m | < 10min | Entry/Exit |
| | | AA:BB:CC:00:00:00 | -55 dBm | 9 | | | |
| | | AA:BB:CC:44:55:66 | -85 dBm | 48 | | | |

920

921

ELECTRONIC DEVICE AND METHOD FOR SCANNING CHANNEL TO PERFORM LOCATION BASED SERVICE

CROSS-REFERENCE TO RELATED APPLICATION

This application is based on and claims priority under 35 U.S.C. 119 to Korean Patent Application No. 10-2019-0025630, filed on Mar. 6, 2019, in the Korean Intellectual Property Office, the disclosures of which are herein incorporated by reference in their entireties.

BACKGROUND

1. Field

The disclosure relates to an electronic device and method for scanning a channel to perform a location-based service at low power.

2. Description of Related Art

Normally, it is possible to identify a real-time location of a user carrying an electronic device such as a portable device and provide the user with information suitable for the identified location. This is often referred to as a location-based service. A navigation service for displaying a user's real-time location on an electronic map and guiding a road on the map, a recommendation service for recommending nearby facilities (e.g., restaurants, gas stations) based on a user's real-time location, and a geofencing service are some examples of the location-based service.

The geofencing service refers to a particular service provided by monitoring a user's entry into or exit from a geofencing area which is a virtually defined area. For example, when the user enters or exits the geofencing area, the electronic device may provide a certain geofencing service (e.g., an advertising service or a notification service) to the user.

The location-based service requires identifying a user's location accurately and quickly. In general, the location-based service uses a global positioning system (GPS) scheme that measures a location on the basis of a signal received from a satellite. The GPS scheme has some drawbacks of having a difficulty in finding an exact location of the electronic device positioned indoors and causing an increase in power consumption. Thus, applying the GPS scheme to the electronic device with limited battery capacity may be undesirable. Alternatively, the location-based service may use a wireless local area network (WLAN) scheme. Compared to the GPS scheme, the WLAN scheme may be advantageous because of being applied indoors and lower power consumption.

The WLAN scheme is to identify a WLAN access point (AP) located around the electronic device through a WLAN scan function and estimate the location of the electronic device by comparing information about the identified WLAN AP with previously registered WLAN information. In the WLAN scheme, as the number of WLAN scans increases, the accuracy and speed of measuring the location of the electronic device may be improved. However, as the number of WLAN scans increases, the power consumption may increase.

SUMMARY

According to various embodiments of the disclosure, an electronic device is capable of providing a location-based service of WLAN scheme to a user at low power by considering characteristics of a channel-specific scan operation and a status of the electronic device.

According to various embodiments of the disclosure, an electronic device may include a wireless communication module performing wireless local area network (WLAN) communication, a processor operatively connected to the wireless communication module, and a memory operatively connected to the processor. The processor may receive geofence-related information from a server in response to execution of an application associated with a geofencing service, identify status information of the electronic device, determine at least one channel based on the received geofence-related information and/or the identified status information of the electronic device, and perform a scan function based on the determined at least one channel.

According to various embodiments of the disclosure, an electronic device may include a wireless communication module performing wireless local area network (WLAN) communication, a processor operatively connected to the wireless communication module, and a memory operatively connected to the processor. The processor may detect a scan function performed for at least one channel, in response to detecting, identify whether the scan function is related to a geofencing service, determine at least one channel when the scan function is related to the geofencing service, and perform the scan function through the wireless communication module, at least in part, based on the determined at least one channel.

According to various embodiments of the disclosure, a method for operating an electronic device may include receiving geofence-related information from a server in response to execution of an application associated with a geofencing service, identifying status information of the electronic device, determining at least one channel based on the received geofence-related information and/or the identified status information of the electronic device, and performing a scan function based on the determined at least one channel.

The electronic device according to various embodiments of the disclosure may include a geofencing module for receiving a geofencing service corresponding to a location-based service, and provide at least one geofencing service to a user based on the location of the electronic device.

According to various embodiments, the electronic device may perform a scan function for detecting a neighboring geofencing service, and select at least one scan channel to at least partially perform the scan function, thereby reducing power consumption required for performing the scan function.

According to various embodiments, the electronic device may select at least one scan channel based on geofence-related information, and partially perform a scan function based on the selected scan channel(s), thereby reducing power consumption for the scan function.

BRIEF DESCRIPTION OF THE DRAWINGS

The above and other aspects, features and advantages of certain embodiments of the disclosure will be more apparent from the following detailed description, taken in conjunction with the accompanying drawings.

FIGS. 7A and 7B are diagrams illustrating a method for determining a scan cycle for a geofencing service according to various embodiments.

FIGS. 8A to 8C are diagrams illustrating a method for performing a scan function based on a scan channel selected for a geofencing service according to various embodiments.

FIGS. 9A and 9B are diagrams illustrating a method for determining a scan channel for a geofencing service according to various embodiments.

DETAILED DESCRIPTION

Figure 1:
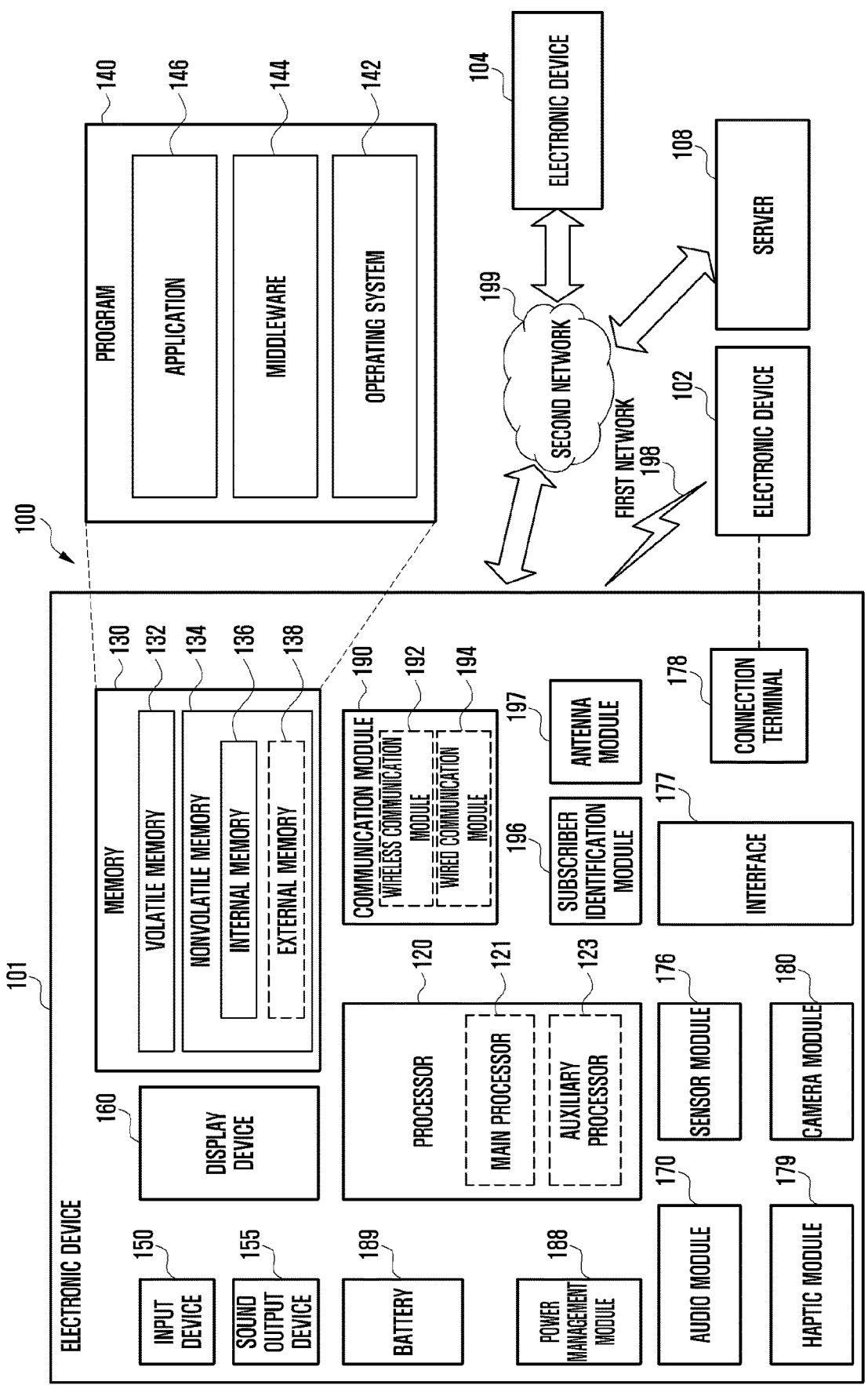
FIG. 1 illustrates a block diagram of an electronic device in a network environment according to various embodiments.

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., dynamic random access memory (DRAM), static RAM (SRAM) or synchronous dynamic RAM (SDRAM)) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
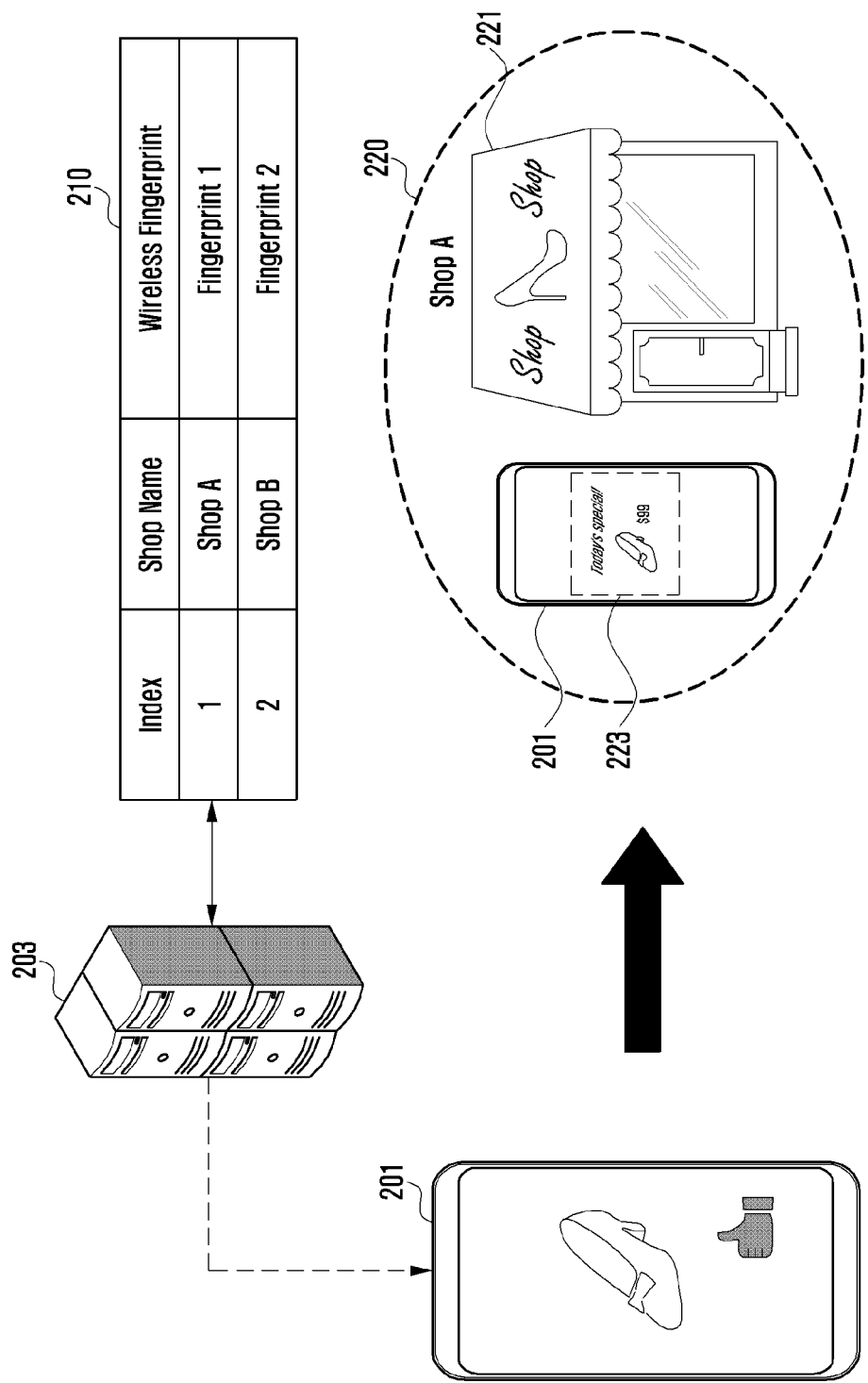
FIG. 2 illustrates a schematic diagram of a process of performing a geofencing service according to various embodiments.

FIG. 2 illustrates a schematic diagram illustrating a process of performing a geofencing service according to various embodiments.

Referring to FIG. 2, an electronic device 201 (e.g., the electronic device 101 in FIG. 1) may receive geofencing-related information 210 (e.g., information about a geofencing area or information about a geofencing service) from a server 203 (e.g., the server 108 in FIG. 1) so as to provide a geofencing service. The geofencing service refers to a particular service that establishes a virtual geofencing area and provides at least one type of content (e.g., advertisement information, coupon information) corresponding to the geofencing area in response to an entry of the electronic device 201 into the geofencing area. For example, a service provider (e.g., an operator of a shop A 221) that provides a certain geofencing service may establish a geofencing area and register geofence-related information 210 corresponding to the established geofencing area in the server 203. The geofence-related information 210 may be directly collected by the service provider or acquired from the server through a crowd sourcing technique. For example, when the electronic device 201 is used as a payment tool at the shop A, the shop A may collect WLAN information through a scan and transmit the collected WLAN information to the server 203. The server may process information received from a plurality of electronic devices and thereby generate the geofence-related information 210 for the shop A.

According to an embodiment, in response to the execution of a program (e.g., an application) associated with the geofencing service, the electronic device 201 may request the geofence-related information 210 from the server 203 and download the geofence-related information 210 from the server 203. According to an embodiment, the geofencing area 220 corresponding to the shop A 221 may be established by the operator of the shop A 221 or a program developer. The geofence-related information 210 may contain "shop name" information, index information, and/or fingerprint information (e.g., WLAN related information, information about an AP located nearby a shop, channel information about an AP, or RSSI information about an AP) with respect to each shop. According to an embodiment, the server 203 may store the geofence-related information 210 in a table form and, in response to a request of the electronic device 201, transmit the geofence-related information 210 to the electronic device 201.

According to an embodiment, the electronic device 201 may execute an application (e.g., the program 140 or the application 146 in FIG. 1) associated with the geofencing service and, in response to the execution of the application, request the geofence-related information 210 (e.g., information about the geofencing service) from the server 203. The execution of the application may include execution in the background. For example, the electronic device 201 may transmit information about a current location of the electronic device 201 to the server 203 and also receive the geofence-related information 210 corresponding to the current location from the server 203. According to an embodiment, the electronic device 201 may periodically receive the geofence-related information 210 from the server 203 at a certain time interval. According to an embodiment, when a new operator providing the geofencing service is registered, the server 203 may update the already stored geofence-related information 210, based on new geofence-related information received from the newly registered operator, and transmit the updated geofence-related information to the electronic device 201.

According to an embodiment, the electronic device 201 may identify a geofencing area established nearby, based on the geofence-related information 210 received from the server 203. For example, when the electronic device 201 enters the geofencing area 220 corresponding to the shop A 221, a geofencing service corresponding to the shop A 221 may be provided to the electronic device 201. For example, coupon information 223 available in the store A 221 may be displayed on a screen of the electronic device 201. According to an embodiment, the electronic device 201 may perform a scan function to detect the geofencing area established nearby.

Figure 3:
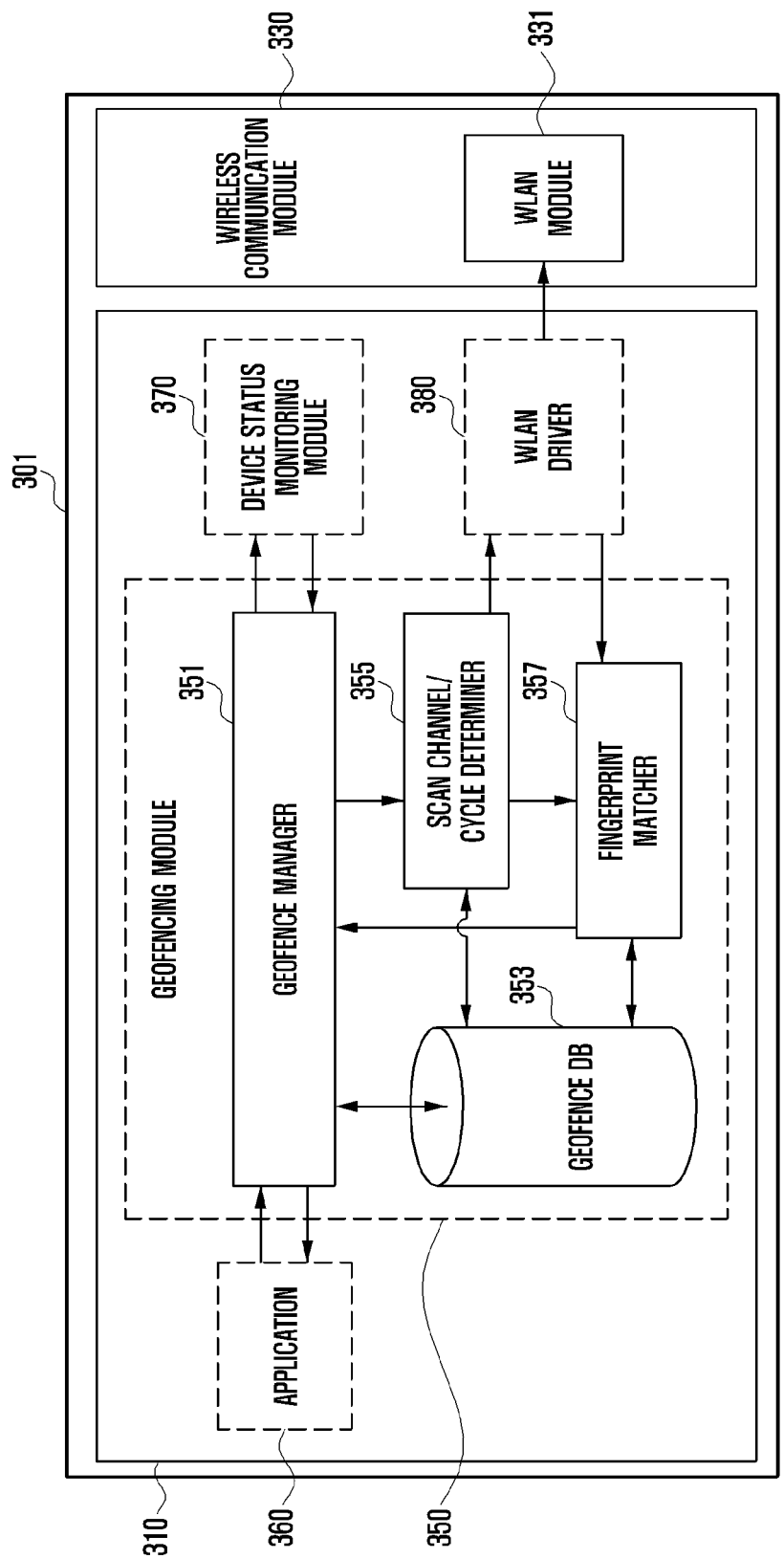
FIG. 3 illustrates a block diagram of an electronic device for providing a geofencing service according to various embodiments.

FIG. 3 illustrates a block diagram of an electronic device for providing a geofencing service according to various embodiments.

Referring to FIG. 3, the electronic device 301 (e.g., the electronic device 101 in FIG. 1) may include a processor 310 (e.g., the processor 120 in FIG. 1) and/or a wireless communication module 330 (e.g., the communication module 190 in FIG. 1). The electronic device 301 may include at least one portable device such as, for example, a smart phone, a tablet, a laptop, or a notebook. The electronic device 301 may communicate with a server (e.g., the server 108 in FIG. 1) through the wireless communication module 330 to transmit or receive data to or from the server.

According to various embodiments, the processor 310 may include a geofencing module 350, an application 360, a device status monitoring module 370, and/or a WLAN driver 380. The processor 310 may include, but not limited to, at least one module for a geofencing service. According to an embodiment, the processor 310 may identify at least one WLAN access point (AP) located nearby through the WLAN driver 380, and may measure index information corresponding to the WLAN AP and a signal state of the WLAN AP. For example, by controlling a WLAN module 331 included in the wireless communication module 330, the WLAN driver 380 may measure signal strength of at least one WLAN AP located nearby.

According to an embodiment, the processor 310 of the electronic device 301 may execute the application 360 associated with the geofencing service to provide the geofencing service and, in response to the occurrence of a geofencing event, provide the geofencing service corresponding to the application 360 to the user. According to an embodiment, the processor 310 may store, in a geofence DB 353, information related to the geofencing area corresponding to the at least one application 360. For example, based on the information stored in the geofence DB 353, the processor 310 may detect an entry event indicating entry into the geofencing area and/or an exit event indicating exit from the geofencing area. Then, in response to the detected event, the processor 310 may provide the geofencing service to the user.

According to various embodiments, the at least one application 360 may receive the geofence-related information from the server and store the received geofence-related information in the geofence DB 353. According to an embodiment, the geofencing module 350 may receive the geofence-related information from the server in response to the execution of the at least one application 360 and store the received geofence-related information in the geofence DB 353. For example, the geofencing module 350 may request the geofence-related information from the server through the wireless communication module 330 and receive the geofence-related information from the server. The geofencing module 350 may store the received geofence-related information in the geofence DB 353. The geofencing module 350 may identify a WLAN signal state, based on the geofence-related information, and detect a geofencing event for at least one geofencing area (e.g., an entry event indicating that the electronic device 301 enters the geofencing area, and/or an exit event indicating that the electronic device 301 exits the geofencing area), based on the identified WLAN signal state. The geofencing module 350 may notify the detection of the geofencing event to the application 360, and then the application 360 may provide the geofencing service to the user. The geofencing module 350 may manage overall functions related to the geofencing service.

According to various embodiments, at least some of the modules included in the processor 310 may be stored in a memory (e.g., the memory 130 in FIG. 1) in the form of an application or program.

According to various embodiments, the geofencing module 350 may include a geofence manager 351, a geofence database (DB) 353, a scan channel/cycle determiner 355, and/or a fingerprint matcher 357. According to an embodiment, the geofence manager 351 may receive the geofence-related information, registered in the server, via the application 360 and store the received geofence-related information in the geofence DB 353 or memory. The geofence manager 351 may perform a notification function when a geofencing event occurs.

Figure 4:
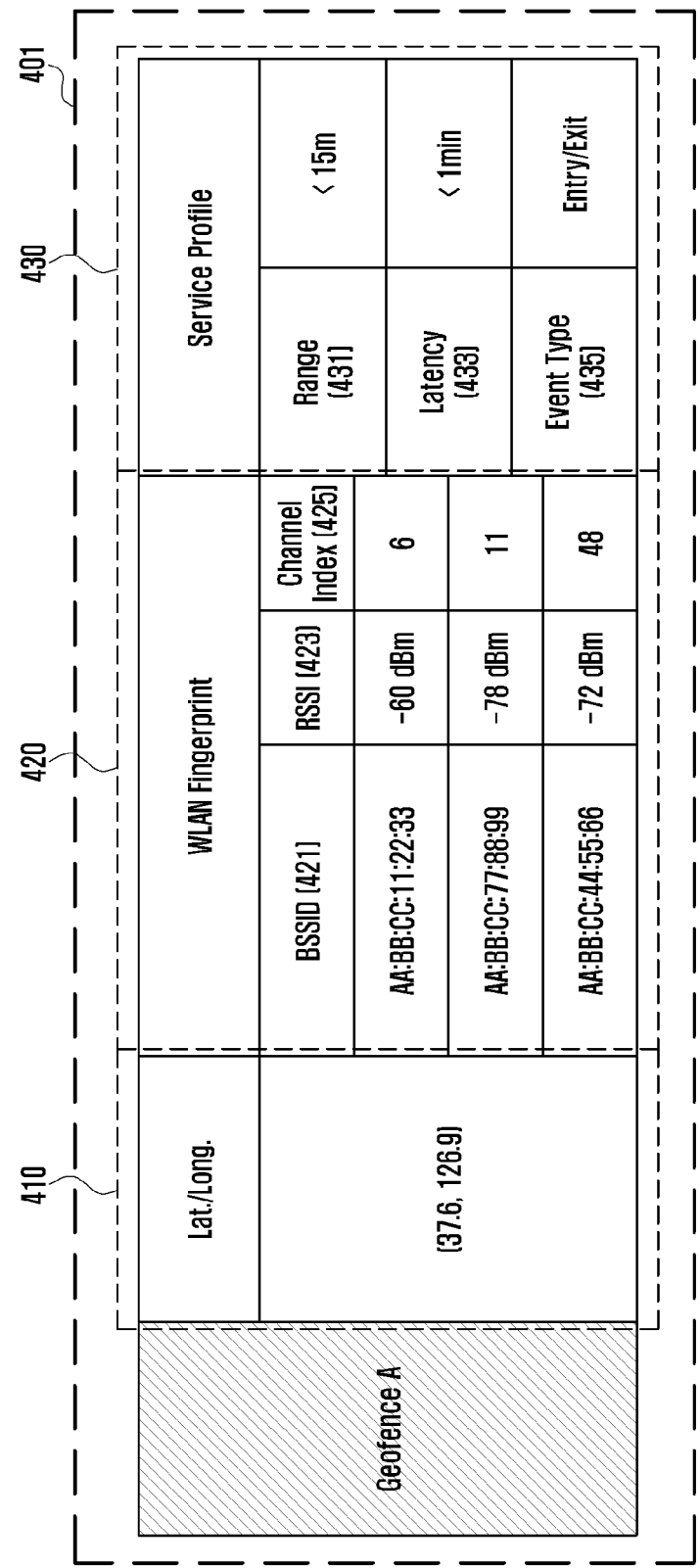
FIG. 4 illustrates a diagram of geofence-related information for a geofencing service according to various embodiments.

As exemplarily shown in FIG. 4, the geofence-related information 401 may contain latitude/longitude (Lat/Long) information 410 corresponding to a geofencing area, WLAN fingerprint information 420, and/or service profile information 430. The WLAN fingerprint information 420 may include a basic service set ID (BSSID) 421, a reference received signal strength indication (RSSI) 423, and/or a channel index 425 of an access point (AP) located around the geofencing area. The service profile 430 may include a range 431 for the geofencing area, a geofencing service allowance latency 433, and/or a geofencing event type 435 (e.g., entry/exit for the geofencing area). The WLAN fingerprint information 420 may be reconfigured in a required form by the geofence manager 351 and stored in the geofence DB 353. According to an embodiment, the geofence manager 351 may request status information of the electronic device 301 from the device status monitoring module 370 and, if a response to the request is temporarily or periodically received, deliver the received status information to the scan channel/cycle determiner 355.

According to various embodiments, the scan channel/cycle determiner 355 may determine a scan cycle and scan channel for detecting a geofencing event, based on the geofence-related information stored in the geofence DB 353 or memory, the status information of the electronic device 301 (e.g., a residual battery level, a moving speed), and/or WLAN channel characteristics (e.g., power consumption or time required for a channel scan). The WLAN channels may include a total of 38 channels and may be divided into three groups (e.g., 2.4 GHz, 5 GHz in dynamic frequency selection (DFS), and 5 GHz in non-DFS). According to an embodiment, as the number of channels to be scanned increases, power consumption caused by executing a scan function may increase. When the scan cycle and the scan channel are determined, the scan channel/cycle determiner 355 may request the WLAN driver 380 to perform a scan function based on the determined scan channel. Also, the scan channel/cycle determiner 355 may transfer the scan channel to the fingerprint matcher 357.

According to various embodiments, the fingerprint matcher 357 may receive a scan result through the WLAN driver 380. Comparing the scan result with the WLAN fingerprint stored in the geofence DB 353, the fingerprint matcher 357 may detect whether a geofencing event occurs. According to an embodiment, based on the scan channel received from the scan channel/cycle determiner 355, the fingerprint matcher 357 may detect whether the geofencing event (e.g., an entry event or an exit event) occurs. According to an embodiment, the geofencing module 350 may perform the scan function at least in part, based on the scan channel determined by the scan channel/cycle determiner 355. When the geofencing event is detected, the fingerprint matcher 357 may transfer detection information to the geofence manager 351. According to an embodiment, the geofence manager 351 may perform a geofencing service in response to the detection of the geofencing event.

According to various embodiments, the geofence DB 353 may store geofence-related information received from the geofence manager 351. According to an embodiment, the geofence DB 353 may be included in a memory (e.g., the memory 130 in FIG. 1) of the electronic device. The geofence DB 353 may store or load data through the geofence manager 351, the scan channel/cycle determiner 355, and/or the fingerprint matcher 357.

According to various embodiments, the device status monitoring module 370 may measure the residual battery level or moving speed of the electronic device 301 and transmit the measured result to the geofence manager 351. The device status monitoring module 370 may check whether a charging cable is connected. According to an embodiment, the electronic device 301 may perform an operation of measuring or identifying the location thereof, based on information received from the device status monitoring module 370. For example, the device status monitoring module 370 may be connected to a communication processor (CP) (e.g., the auxiliary processor 123 in FIG. 1) or a sensor hub (e.g., an activity tracker) and thereby monitor the device status. According to an embodiment, the device status monitoring module 370 may be connected to a power management module (e.g., the power management module 188 in FIG. 1) or a sensor module (e.g., the sensor module 176 in FIG. 1). According to an embodiment, the sensor hub may be a microprocessor unit (MPU) that is connected to at least one sensor of the electronic device 301 and checks information of the at least one sensor. The geofence manager 351 may request the scan channel/cycle determiner 355 to determine the scan cycle and the number of channels to be scanned, based on information (e.g., the residual battery level or the moving speed) received from the device status monitoring module 370. For example, when the residual battery level is less than a threshold value (i.e., a low battery level), the scan channel/cycle determiner 355 may reduce battery consumption by reducing the number of channels to be scanned. According to various embodiments, in performing the geofencing service, the electronic device 301 may reduce battery consumption by reducing the number of unnecessary scan functions. Thus, the electronic device 301 may efficiently use the battery or power.

According to various embodiments, the WLAN driver 380 may be a module that controls, at least in part, WLAN hardware (e.g., a WLAN chip or WLAN module 331) of the electronic device. According to various embodiments, the WLAN driver 380 may receive, from the scan channel/cycle determiner 355, information about at least one channel to perform the scan function. In response to a scan request of the scan channel/cycle determiner 355, the WLAN driver 380 may control the WLAN module 331 included in the wireless communication module 330 and perform the scan function for the at least one channel through the WLAN module 331. The WLAN driver 380 may transmit a result of performing the scan function (e.g., BSSID or RSSI information about a neighboring AP) to the fingerprint matcher 357.

According to various embodiments, the wireless communication module 330 may include the WLAN module 331 and perform the WLAN scan function through the WLAN module 331. According to an embodiment, the WLAN driver 380 included in the processor 310 may control, at least in part, the WLAN module 331 to perform the WLAN scan function. There may be a plurality of WLAN modules 331, which may simultaneously perform the WLAN scan function on different frequency bands. For example, the WLAN module 331 may include a first WLAN module supporting a 2.4 GHz band according to the WLAN scheme and a second WLAN module supporting a 5 GHz band according to the WLAN scheme. The processor 310 may simultaneously perform the WLAN scan function through the first and second WLAN modules, based on the 2.4 GHz band and the 5 GHz band according to the WLAN scheme. According to an embodiment, when there is only one WLAN module 331, the processor 310 may change a frequency band to perform the WLAN scan function corresponding to at least one of the 2.4 GHz band and the 5 GHz band. That is, the processor 310 may perform the WLAN scan function corresponding to any one of the 2.4 GHz band and the 5 GHz band and then perform the WLAN scan function corresponding to the other.

FIG. 4 illustrates a diagram of geofence-related information for a geofencing service according to various embodiments.

According to an embodiment, an electronic device (e.g., the electronic device 301 in FIG. 3) may receive the geofence-related information 401 from a server (e.g., the server 108 in FIG. 1).

The geofence-related information 401 may include location information 410 (e.g., latitude/longitude) for an established geofencing area, WLAN fingerprint information 420 corresponding to the geofencing area, and/or service profile information 430 (e.g., range information 431 of the geofencing area, a geofencing service allowance latency 433, and/or a geofencing event type 435). According to an embodiment, the WLAN fingerprint information 420 may include BSSID information 421 for an AP, RSSI information 423 corresponding to signal strength, and/or a channel index 425. According to an embodiment, the electronic device may detect a geofencing event (e.g., an entry event or an exit event) by comparing the WLAN fingerprint information 420 with a result of a scan through the WLAN module 331.

Referring to FIG. 4, "Geofence A" is an example of a geofencing area established to correspond to specific coordinates of latitude and longitude (e.g., [37.6, 126.9]). As shown in the geofence-related information 401 for "Geofence A", three neighboring APs may be located around "Geofence A". Based on information about these APs, it is possible to determine an entry into or an exit from "Geofence A". Depending on the established geofencing area, at least one AP may be located nearby. That is, the number of APs is not fixed.

As a result of performing a WLAN scan, the first AP (AA:BB:CC:11:22:33) may be measured with signal strength of about −60 dBm on channel 6, the second AP (AA:BB:CC:77:88:99) may be measured with signal strength of about −78 dBm on channel 11, and the third AP (AA:BB:CC:44:55:66) may be measured with signal strength of about −72 dBm on channel 48. This case may be determined as a state of entering "Geofence A". "Geofence A" may be established to have the radius range 431 less than about 15 meters and also have the geofencing service allowance latency 433 less than about 1 minute.

According to an embodiment, based on signal strength measured for each of the first, second, and third APs, the electronic device may determine to enter the established geofencing area (e.g., within the radius range 431 of about 15 meters corresponding to "Geofence A"). According to an embodiment, the electronic device may determine a scan cycle for detecting a geofencing event, based on the geofencing service allowance latency 433 corresponding to "Geofence A".

According to various embodiments of the disclosure, an electronic device (e.g., the electronic device 301 in FIG. 3) may include a wireless communication module (e.g., the wireless communication module 330 in FIG. 3) performing wireless local area network (WLAN) communication, a processor (e.g., the processor 310 in FIG. 3) operatively connected to the wireless communication module 330, and a memory (e.g., the memory 130 in FIG. 1) operatively connected to the processor 310. The processor 310 may receive geofence-related information from a server (e.g., the server 108 in FIG. 1) in response to execution of an application associated with a geofencing service, identify status information of the electronic device 301, determine at least one channel based on the received geofence-related information and/or the identified status information of the electronic device, and perform a scan function based on the determined at least one channel.

According to an embodiment, the processor 310 may detect a geofencing event by performing the scan function corresponding to the at least one channel, and perform the geofencing service corresponding to the detected geofencing event.

According to an embodiment, the geofencing event may include an entry event indicating that the electronic device 301 enters a geofencing area, and/or an exit event indicating that the electronic device 301 exits the geofencing area.

According to an embodiment, the processor 310 may determine a minimum scan cycle based on the received geofence-related information, identify power consumption required for performing the scan function, based on a residual battery level contained in the status information of the electronic device 301 and/or the determined minimum scan cycle, and determine the at least one channel based on the identified power consumption.

According to an embodiment, the processor 310 may identify a scan power allowance consumed per hour when performing the scan function, and determine the at least one channel within a range satisfying the scan power allowance.

According to an embodiment, the processor 310 may, when the received geofence-related information is a plurality of pieces of geofence-related information, determine, as the minimum scan cycle, a smallest scan cycle among scan cycles contained in the plurality of pieces of geofence-related information.

According to an embodiment, the processor 310 may, when the received geofence-related information is a plurality of pieces of geofence-related information, determine the at least one channel based on a common channel contained in the plurality of pieces of geofence-related information.

According to an embodiment, the processor 310 may determine the at least one channel based on a frequency band corresponding to the WLAN communication and/or characteristics of the frequency band.

According to an embodiment, the frequency band corresponding to the WLAN communication may include a 2.4 GHz band and/or a 5 GHz band, and the processor 310 may determine the at least one channel based on the 2.4 GHz band, determine the at least one channel by combining the 2.4 GHz band and/or the 5 GHz band, or determine the at least one channel except for a dynamic frequency selection (DFS) channel corresponding to the 5 GHz band.

According to an embodiment, the processor 310 may determine the at least one channel by preferentially selecting a channel corresponding to the 2.4 GHz band between the 2.4 GHz band and/or the 5 GHz band.

According to an embodiment, the geofence-related information may include location information of a geofencing area, basic service set ID (BSSID) information of an access point (AP) located around the geofencing area, reference received signal strength indication (RSSI) information of the AP, channel information of the AP, range information about the geofencing area, type information about a geofencing event, and/or information about geofencing service allowance latency.

According to various embodiments of the disclosure, an electronic device 301 may include a wireless communication module 330 performing wireless local area network (WLAN) communication, a processor 310 operatively connected to the wireless communication module 330, and a memory 130 operatively connected to the processor 310. The processor 310 may detect a scan function performed for at least one channel, in response to detecting, identify whether the scan function is related to a geofencing service, determine at least one channel when the scan function is related to the geofencing service, and perform the scan function through the wireless communication module, at least in part, based on the determined at least one channel.

According to an embodiment, the processor 310 may determine the at least one channel, based on a time required for performing the scan function.

Figure 5:
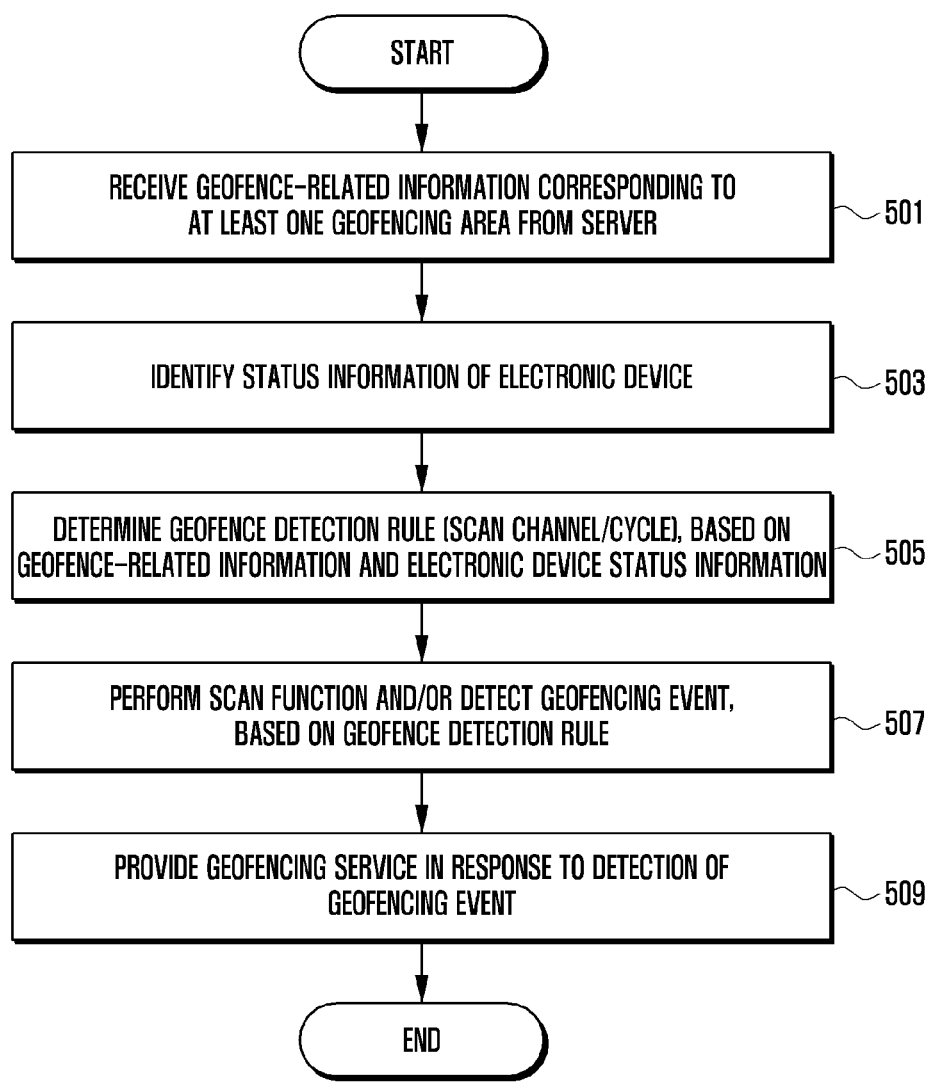
FIG. 5 illustrates a flow diagram of a method for performing a geofencing service according to various embodiments.

FIG. 5 illustrates a flow diagram of a method for performing a geofencing service according to various embodiments.

Referring to FIG. 5, at operation 501, a processor (e.g., the processor 310 in FIG. 3) of an electronic device (e.g., the electronic device 301 in FIG. 3) may receive geofence-related information (e.g., the geofence-related information 401 in FIG. 4) corresponding to at least one geofencing area from a server (e.g., the server 108 in FIG. 1). For example, the at least one geofencing area may be a virtual area established by an operator that provides a geofencing service. According to an embodiment, in response to the execution of an application associated with the geofencing service, the electronic device 301 may request and receive the geofence-related information 401 from the server. According to an embodiment, the processor 310 of the electronic device 301 may control a geofence manager (e.g., the geofence manager 351 in FIG. 3) to store the received geofence-related information 401 in a geofence database (e.g., the geofence DB 353 in FIG. 3). According to another embodiment, the processor 310 may store the received geofence-related information 401 in a memory (e.g., the memory 140 in FIG. 1).

At operation 503, the processor 310 may identify status information (e.g., a residual battery level and/or a moving speed) of the electronic device 301. For example, the geofencing module 350 (or the geofence manager 351) may request and receive the status information of the electronic device 301 from a device status monitoring module (e.g., the device status monitoring module 370 in FIG. 3). According to an embodiment, when the geofence-related information 401 is stored in the geofence DB 353, the geofencing module 350 (or the geofence manager 351) may request the status information of the electronic device 301 from the device status monitoring module 370. The device status monitoring module 370 may immediately respond to the request or may respond according to a given period.

At operation 505, the processor 310 may determine a geofence detection rule (e.g., a scan channel and/or a scan cycle), based on the geofence-related information 401 and the status information of the electronic device 301. For example, a scan channel/cycle determiner (e.g., the scan channel/cycle determiner 355 in FIG. 3) of the processor 310 may determine the minimum cycle of a scan function based on the geofence-related information 401 and also determine at least one scan channel for performing the scan function in consideration of the residual battery level of the electronic device 301. According to an embodiment, in performing the scan function for the geofencing service, the electronic device 301 may determine at least one scan channel and the scan cycle and, based on the determined scan channel(s) and scan cycle, perform the scan function. Determining the at least one scan channel and then performing the scan function based on the determined scan channel(s), the electronic device 301 may reduce power consumption caused by performing the scan function. For example, in order to reduce power consumption, the electronic device 301 may perform a scan function (e.g., a partial scan) corresponding to at least some scan channels rather than perform a scan function (e.g., a full scan) corresponding to all the scan channels.

At operation 507, based on the determined geofence detection rule, the processor 310 may perform a scan function and detect a geofencing event by controlling a WLAN module (e.g., the WLAN module 331 in FIG. 3). According to an embodiment, the processor 310 may determine at least one scan channel and perform a scan function based on the determined scan channel(s). The scan function may be an operation of performing a WLAN scan through the WLAN module 331 included in the wireless communication module 330. The WLAN scan may be performed based on a total of 38 channels (e.g., 13 channels of 2.4 GHz, 9 channels of 5 GHz_non DFS, and 16 channels of 5 GHz_DFS). Instead of performing a full scan on all the scan channels (e.g., 38 channels), the processor 310 may perform a partial scan on at least one scan channel through the WLAN module 331. For example, controlling the WLAN module 331 at least in part, the processor 310 may perform a partial scan based on 13 channels corresponding to the 2.4 GHz band or perform a partial scan on at least some channels by combining the 2.4

GHz band and the 5 GHz band. According to an embodiment, such a partial scan may be performed based on channels other than the DFS channel (e.g., 16 channels of 5 GHz_DFS). The DFS channel may have a relatively long scan time and larger power consumption. In addition, because of being defined for satellite communication, the DFS channel may be limited in use for WLAN and be a very low frequency of use. According to various embodiments, the electronic device 301 may perform a scan function corresponding to at least one scan channel through the WLAN module 331, thus reducing power consumption caused by performing the scan function. According to an embodiment, the processor 310 may receive a scan result of performing the scan function through the WLAN module 331 and compare the received scan result with WLAN fingerprint information contained in the geofence-related information received from the server. Then, based on a result of comparison, the processor 310 may detect a geofencing event. For example, the processor 310 may detect whether the electronic device 301 enters the geofencing area (i.e., an entry event) or exits the geofencing area (i.e., an exit event).

At operation 509, the processor 310 may provide a geofencing service to the user in response to the detection of the geofencing event. According to an embodiment, based on the detection result of the geofencing event, the processor 310 may perform a geofencing service previously stored in the geofence DB 353 or perform a geofencing service by receiving the geofencing service from the server 203. For example, the geofencing service may be what provides the user with content information (e.g., advertisement information or coupon information) offered by an operator that establishes the geofencing area. According to an embodiment, the processor 310 may detect the occurrence of the geofencing event for the established geofencing area and, in response to the detection, perform the geofencing service providing at least one kind of content information.

Figure 6:
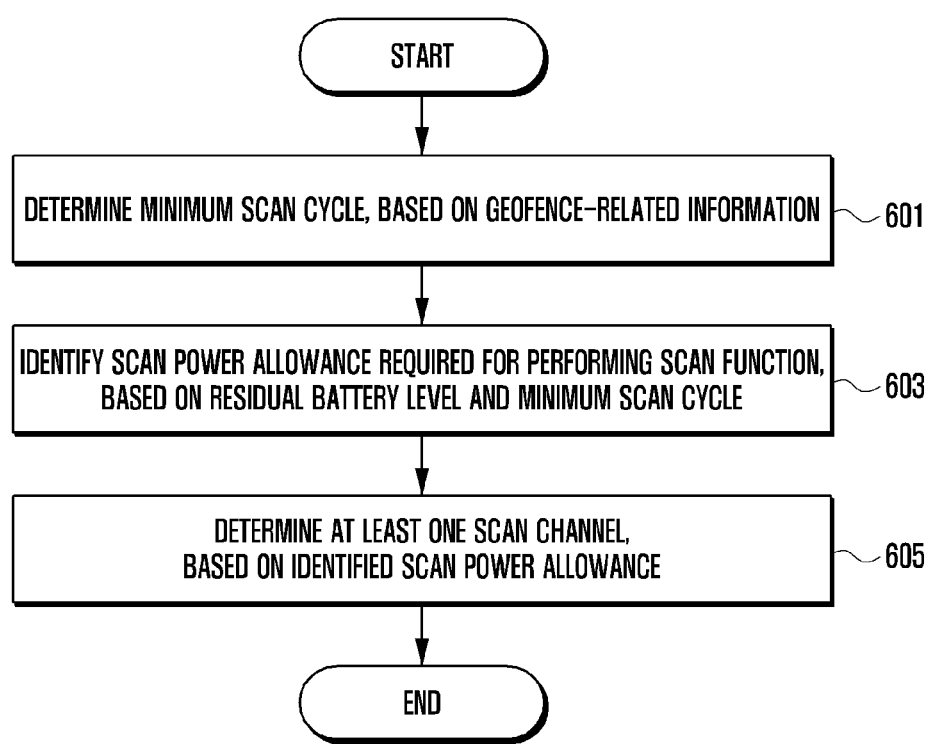
FIG. 6 illustrates a flow diagram of a method for determining a scan channel to efficiently perform a geofencing service according to various embodiments.

FIG. 6 illustrates a flow diagram of a method for determining a scan channel to efficiently perform a geofencing service according to various embodiments.

FIG. 6 shows a detailed flow of the above-described operation 505 in FIG. 5. That is, FIG. 6 shows a detailed process of determining the geofence detection rule.

Referring to FIG. 6, at operation 601, the processor (e.g., the processor 310 in FIG. 3) of the electronic device (e.g., the electronic device 301 in FIG. 3) may determine the minimum scan cycle for performing the scan function, based on the geofence-related information. For example, the geofence-related information (e.g., the geofence-related information 401 in FIG. 4) may include the geofencing service allowance latency (e.g., the geofencing service allowance latency 433 in FIG. 4). The processor 310 may determine the minimum scan cycle, based on the geofencing service allowance latency 433. According to an embodiment, the processor 310 may collect the geofencing service allowance latency 433 included in the service profile (e.g., the service profile 430 in FIG. 4) of the geofence-related information and determine the minimum scan cycle. In order to detect the geofencing event, the processor 310 may perform at least one scan function. When the at least one scan function is performed, a scan result may be compared with the geofence-related information. Thus, based on the lowest geofencing service allowance latency 433, the processor 310 may determine the minimum scan cycle.

According to an embodiment, at operation 603, the processor 310 may identify a scan power allowance (e.g., power consumption boundary) required for performing the scan function, based on the residual battery level recorded in the status information of the electronic device 301 and the determined minimum scan cycle. For example, the scan power allowance refers to the maximum allowable amount of power consumed when the electronic device 301 performs a scan once, and the processor 310 may determine the battery consumption per hour, based on the scan power allowance. For example, if the battery capacity of the electronic device 301 is about 3000 mAh, and if the geofencing scan function is to be performed using a battery of about 1% or less per hour, power of about 30 mAh may be required per hour. If the minimum scan cycle determined at the operation 601 is 30 seconds, the scan power allowance ($P_B$) may satisfy the following equation.

$$P_B * \text{Number of scans per hour}(3600 \ (s)/30 \ (s)) \leq 30 \ (\text{mAh}) \quad \text{Equation 1}$$

According to the above equation, when the minimum scan cycle is 30 seconds, the scan power allowance ($P_B$) may be about 0.25 mAh. According to various embodiments, the processor 310 may determine the number of scans performed per hour, based on the determined minimum scan cycle, and also determine the scan power allowance, based on the determined number of scans performed. The processor 310 may determine at least one scan channel within a range that does not exceed the scan power allowance.

According to an embodiment, at operation 605, the processor 310 may determine at least one scan channel, based on the identified scan power allowance. According to an embodiment, instead of performing a scan function corresponding to all the scan channels, the processor 310 may determine at least one scan channel and control the WLAN module 331 to perform the scan function on the determined at least one scan channel. According to an embodiment, as the number of channels to be scanned increases, power consumption may increase. In addition, depending on the characteristics of a frequency band to be scanned, power consumption may vary. For example, when the WLAN scan function is performed, power consumption in the 2.4 GHz frequency band may be less than power consumption in the 5 GHz frequency band. According to an embodiment, in performing the WLAN scan function through the WLAN module 331, the processor 310 may perform the WLAN scan function based on both the 2.4 GHz frequency band and the 5 GHz frequency band. At the above operation 603, the processor 310 may also identify the power consumption caused by performing the scan function and determine the number of channels suitable for target power consumption and detection performance. According to an embodiment, the processor 310 may select a channel to perform the scan function, based on the determined number of channels. As such, the electronic device 301 can reduce power consumption required for the scan function by efficiently performing the scan function.

FIGS. 7A and 7B are diagrams illustrating a method for determining a scan cycle for a geofencing service according to various embodiments.

Specifically, FIG. 7A shows geofence-related information 710 for "Geofence A", and FIG. 7B shows geofence-related information 720 for "Geofence B". For example, the geofence-related information 710 may be associated with a geofencing service provided by operator A, and the geofence-related information 720 may be associated with a geofencing service provided by operator B.

Referring to FIG. 7A, the geofencing service allowance latency for "Geofence A" may be about one minute as indicated by 711. Referring to FIG. 7B, the geofencing service allowance latency for "Geofence B" may be about ten minutes as indicated by 721. According to various embodiments, in order to detect a geofencing event, the processor 310 may perform at least one scan function. Because scan information of the scan function and WLAN fingerprint information corresponding to geofence may be compared with each other when at least one scan function is performed, the processor 310 may determine the minimum scan cycle as one minute 711 which is a smaller geofencing service allowance latency between the geofence-related information 710 and the geofence-related information 720. Then, based on the determined minimum scan cycle, the processor 310 may perform the scan function.

FIGS. 8A to 8C are diagrams illustrating a method for performing a scan function based on a scan channel selected for a geofencing service according to various embodiments.

Specifically, FIG. 8A shows geofence-related information 810 for "Geofence A", and FIG. 8B shows geofence-related information 820 for "Geofence B". In addition, FIG. 8C shows a table 830 corresponding to a scan result when at least one channel to be scanned is determined based on both the geofence-related information 810 and the geofence-related information 820.

Referring to FIGS. 8A and 8C, a processor (e.g., the processor 310 in FIG. 3) may perform a scan function on five scan channels in connection with "Geofence A" and "Geofence B". The processor 310 may compare the table 830 corresponding to the scan result with the geofence-related information 810 for "Geofence A" and, based on channel 6, 11, or 48, determine whether a geofencing event is detected. For example, if the RSSI value according to the scan result and the RSSI value included in the geofence-related information 810 are similar, the processor 310 may determine that the electronic device 301 is adjacent to the geofencing area. In FIGS. 8A and 8C, the RSSI value according to the scan result and the RSSI value included in the geofence-related information 810 are similar, so that the processor 810 may identify that a geofencing event for "Geofence A" has occurred.

Referring to FIGS. 8B and 8C, the processor 310 may compare the table 830 corresponding to the scan result with the geofence-related information 820 for "Geofence B" and, based on channel 6, 9, or 48, determine whether a geofencing event is detected. If the RSSI value according to the scan result and the RSSI value included in the geofence-related information 820 are not similar, the processor 310 may determine that the electronic device 301 is not adjacent to the geofencing area. In FIGS. 8B and 8C, the RSSI value according to the scan result and the RSSI value included in the geofence-related information 820 are not similar, so that the processor 810 may identify that a geofencing event for "Geofence B" has not occurred.

FIGS. 9A and 9B illustrate a method for determining a scan channel for a geofencing service according to various embodiments.

Specifically, FIG. 9A shows geofence-related information 910 for "Geofence A", and FIG. 9B shows geofence-related information 920 for "Geofence B".

Referring to FIGS. 9A to 9B, common scan channels of "Geofence A" and "Geofence B" may be channels 6 and 48. For example, in order to detect "Geofence A" and "Geofence B", if two channels can be selected according to the scan power allowance, a processor (e.g., the processor 310 in FIG. 3) may determine channels 6 and 48 as indicated by 911 among scan channels corresponding to "Geofence A" and also determine channels 6 and 48 as indicated by 921 among scan channels corresponding to "Geofence B". According to an embodiment, the processor 310 may determine the channels 6 and 48, as indicated by 911 and 912, corresponding to common scan channels among scan channels corresponding to "geofence A" and "geofence B". Then, based on the determined channels 6 and 48, the processor 310 may perform a scan function, at least in part, through a WLAN module (e.g., the WLAN module 331 in FIG. 3). According to an embodiment, the processor 310 may control the WLAN module 331 to perform a scan function and detect a geofencing event through the scan function. Then, in response to the detection of the geofencing event, the processor 310 may perform a geofencing service. If the geofencing event is an event corresponding to "Geofence A", the processor 310 may provide a geofencing service corresponding to "Geofence A" to the user.

Figure 10:
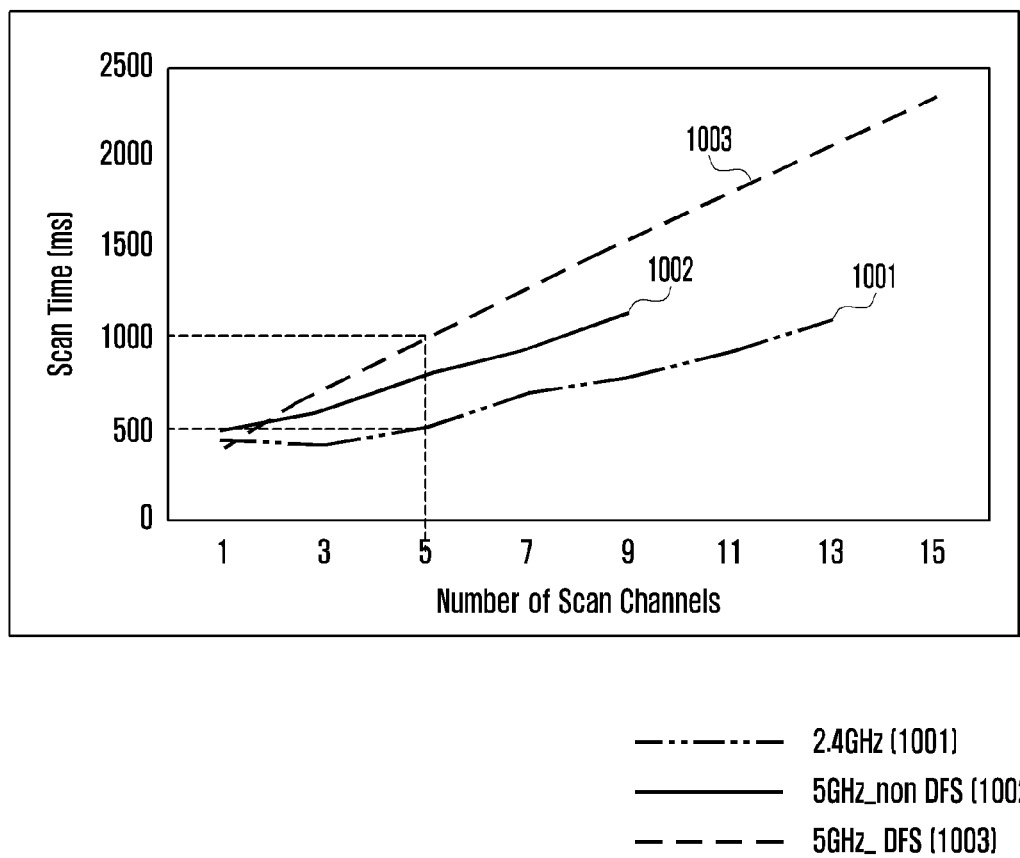
FIG. 10 illustrates a graph of a relation between a scan time and the number of scan channels according to various embodiments.

FIG. 10 illustrates a graph of a relation between a scan time and the number of scan channels according to various embodiments.

Referring to FIG. 10, the WLAN scan may be performed by dividing frequency bands into three groups (e.g., 2.4 GHz band 1001, 5 GHz_non-dynamic frequency selection (non-DFS) band 1002, and 5 GHz_DFS band 1003). For example, the WLAN scan may be performed based on a total of 38 channels (e.g., 13 channels of 2.4 GHz, 9 channels of 5 GHz_non-DFS, and 16 channels of 5 GHz_DFS). As the number of channels to perform the scan function increases, the scan time required for performing the scan function may also increase. Performing the scan function based on all channels (38 in total) is referred to as "a full scan", and performing the scan function based on at least one selected channel is referred to as "a partial scan". A graph of FIG. 10 shows that the scan time increases as the number of channels performing the scan function increases. For example, a two-dot chain line 1001 denotes a variation of the scan time for 13 channels corresponding to the 2.4 GHz band. A solid line 1002 denotes a variation of the scan time for 9 channels corresponding to the 5 GHz_non-DFS band. A dotted line 1003 denotes a variation of the scan time for 16 channels corresponding to the 5 GHz_DFS band. According to an embodiment, as the number of channels to perform the scan function increases, the time required to perform the scan function may increase.

According to an embodiment, the scan time in a relatively low frequency band (e.g., 2.4 GHz) may be less than the scan time in a high frequency band (e.g., 5 GHz). For example, referring to FIG. 10, when performing a scan function for five channels, the scan time of about 500 ms may be required for the 2.4 GHz band 1001, and the scan time of about 1000 ms may be required for the 5 GHz_non-DFS band 1002. According to an embodiment, when performing a WLAN scan, the scan time in the channel corresponding to the 2.4 GHz band 1001 may be the smallest, and the scan time in the channel corresponding to the 5 GHz_DFS band 1003 may be the greatest.

Referring to FIG. 10, as the number of channels to perform the scan function increases, the time required for performing the scan function may increase. Also, the scan time may be greater in a relatively high frequency band than in a low frequency band. For example, the scan time required to perform the scan function for one channel may be less than the scan time required to perform the scan function for five channels. According to an embodiment, when performing a scan function of the WLAN scheme (i.e., a WLAN scan), a relatively long time may be required when performing the scan function based on the 5 GHz_DFS band 1003. According to an embodiment, in performing the WLAN scan, the processor 310 may select a scan-available channel (e.g., a channel corresponding to the 2.4 GHz band 1001 or the 5 GHz_non-DFS band 1002) except for the DFS channel corresponding to the 5 GHz_DFS band 1003, which is substantially less frequently used, thereby saving the scan time required to perform the scan function. According to an embodiment, as the DFS channel is excluded, the number of channels to perform the scan function may be reduced, and power consumed by the scan function may also be reduced. When performing the WLAN scan, the processor 310 may perform the "partial scan" based on at least one channel except for the DFS channel.

Figure 11:
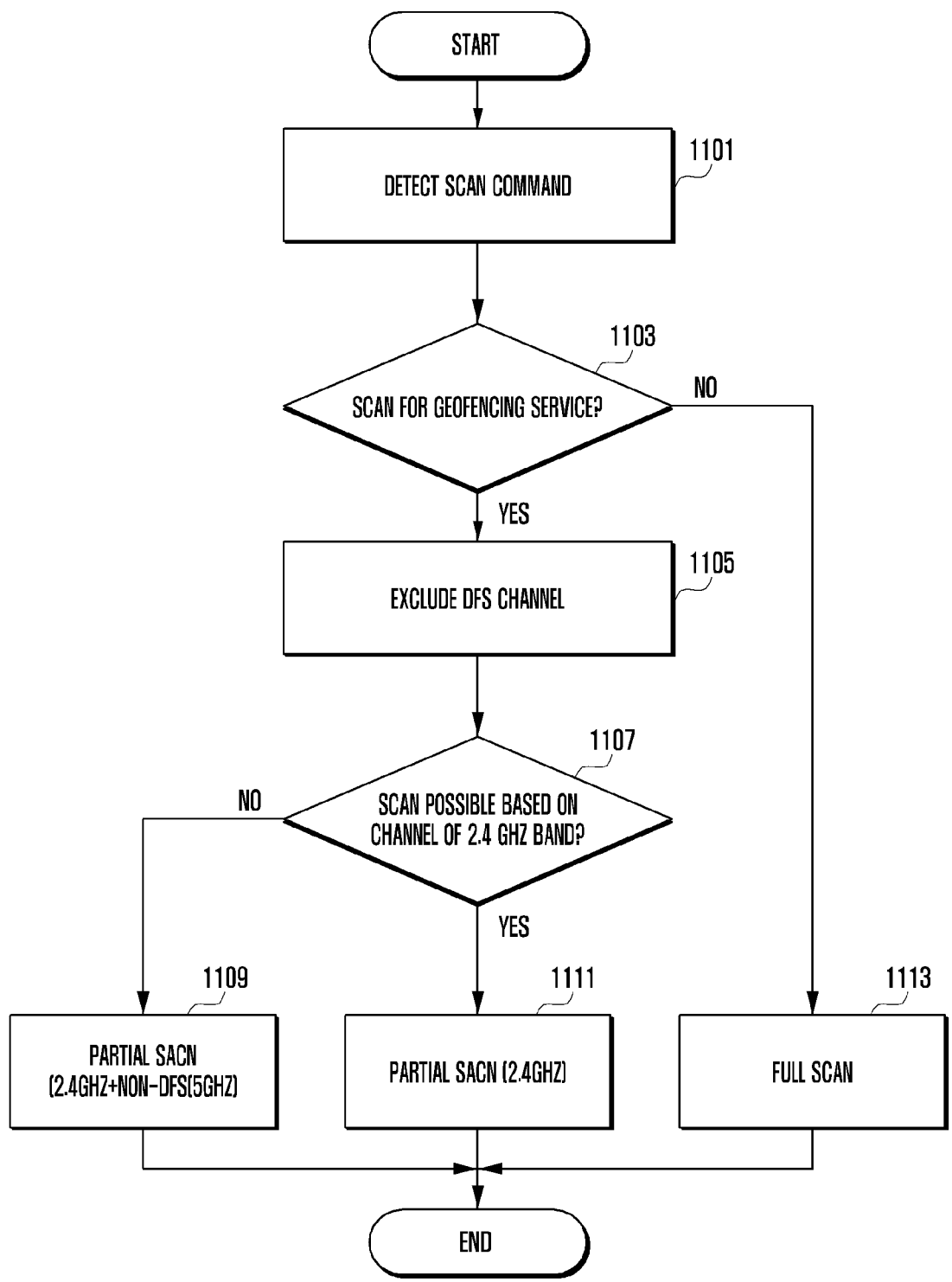
FIG. 11 illustrates a flow diagram of a method for performing a partial scan by excluding a DFS channel when performing a scan function according to various embodiments.

FIG. 11 illustrates a flow diagram of a method for performing a partial scan by excluding a DFS channel when performing a scan function according to various embodiments. FIG. 11 may correspond to the above-described operation 605 in FIG. 6.

Referring to FIG. 11, at operation 1101, a processor (e.g., the processor 310 in FIG. 3) of an electronic device (e.g., the electronic device 301 in FIG. 3) may detect a scan command. For example, the processor 310 may scan at least one channel for detecting a geofencing event. According to an embodiment, when performing a scan function for at least one channel, the processor 310 may detect a scan command according to performing the scan function.

At operation 1103, in response to detecting the scan command, the processor 310 may determine whether the scan function is for a geofencing service. For example, if the scan function is performed to detect a geofencing event in a state where a geofencing area related to a geofencing service is established, the scan function may be what is related to the geofencing service. According to an embodiment, in response to executing an application for providing the geofencing service, the processor 310 may perform the scan function for the geofencing service. According to another embodiment, the processor 310 may perform the scan function for the geofencing service, based on the location of the electronic device 301. If it is determined at operation 1103 that the scan function is not for the geofencing service, the processor 310 may perform a "full scan" at operation 1113. For example, when performing a WLAN scan, the "full scan" may be to perform the scan function for all WLAN channels (e.g., 38 channels).

When it is determined at operation 1103 that the scan function is for the geofencing service, the processor 310 may exclude, at operation 1105, a DFS channel that is substantially less frequently used than other channels. For example, the DFS channel may be a total of 16 channels corresponding to the 5 GHz_DFS band, and may be a channel having a relatively long scan time and large power consumption. According to an embodiment, the processor 310 may reduce power consumption for the scan function by performing a "partial scan" except for the DFS channel.

At operation 1107, the processor 310 may determine whether the scan function is possible based on a channel of the 2.4 GHz band. For example, when performing the WLAN scan function, three channel indexes to perform the scan function may be determined, and if channels of the 2.4 GHz band are three or more, the channels of the 2.4 GHz band may be used preferentially to perform the scan function. According to an embodiment, the number of channel indexes for performing the WLAN scan function is not limited. According to an embodiment, if the number of channels of the 2.4 GHz band is greater than the determined number of channel indexes, the processor 310 may perform the WLAN scan function based on the channels of the 2.4 GHz band. For example, if the number of channel indexes to perform the scan function is determined to be three, and if there are less than three channels of the 2.4 GHz band, the scan function may be performed by combining channels of the 2.4 GHz band and channels of the 5 GHz band. According to an embodiment, if the number of channels of the 2.4 GHz band is less than the determined number of channel indexes, the processor 310 may perform the WLAN scan function based on a combination of the channels of the 2.4 GHz band and the channels of the 5 GHz band. According to an embodiment, the processor 310 may identify a frequency band for performing the scan function, based on the channel index. For example, the channel indexes corresponding to the 2.4 GHz band may be from channel 1 to channel 13, and the channel indexes corresponding to the 5 GHz band may be channel 36 or more.

If it is determined at operation 1107 that it is not possible to perform the scan function based on the channel of the 2.4 GHz band, the processor 310 may perform a "partial scan" by combining the channel of the 2.4 GHz band and the channel of the 5 GHz band at operation 1109.

If it is determined at operation 1107 that it is possible to perform the scan function based on the channel of the 2.4 GHz band, the processor 310 may perform a "partial scan" based on the channel of the 2.4 GHz band at operation 1111.

According to an embodiment, the processor 310 may perform the WLAN scan function based on different bands (e.g., the 2.4 GHz band and the 5 GHz band). According to an embodiment, there may be a plurality of WLAN modules (e.g., the WLAN module 331 in FIG. 3), and the WLAN scan function may be performed based on different frequency bands at the same time. For example, the WLAN module 331 may include a first WLAN module (e.g., supporting the 2.4 GHz band according to the WLAN scheme) and a second WLAN module (e.g., supporting the 5 GHz band according to the WLAN scheme). According to an embodiment, the processor 310 may simultaneously perform the WLAN scan function through the first and second WLAN modules, based on the 2.4 GHz band and the 5 GHz band according to the WLAN scheme. According to an embodiment, when there is only one WLAN module 331, the processor 310 may change a frequency band to perform the WLAN scan function corresponding to at least one of the 2.4 GHz band and the 5 GHz band.

According to various embodiments of the disclosure, a method for operating an electronic device (e.g., the electronic device 301 in FIG. 3) may include receiving geofence-related information from a server (e.g., the server 108 in FIG. 1) in response to execution of an application associated with a geofencing service, identifying status information of the electronic device 301, determining at least one channel based on the received geofence-related information and/or the identified status information of the electronic device 301, and performing a scan function based on the determined at least one channel.

According to an embodiment, the method may further include detecting a geofencing event by performing the scan function corresponding to the at least one channel, and performing the geofencing service corresponding to the detected geofencing event. The geofencing event may include an entry event indicating that the electronic device 301 enters a geofencing area, and/or an exit event indicating that the electronic device 301 exits the geofencing area.

According to an embodiment, the determining at least one channel may include determining a minimum scan cycle based on the received geofence-related information, identifying power consumption required for performing the scan function, based on a residual battery level contained in the status information of the electronic device 301 and/or the determined minimum scan cycle, and determining the at least one channel based on the identified power consumption.

According to an embodiment, the determining at least one channel may include identifying a scan power allowance consumed per hour when performing the scan function, and determining the at least one channel within a range satisfying the scan power allowance.

According to an embodiment, the determining a minimum scan cycle may include, when the received geofence-related information is a plurality of pieces of geofence-related information, determining, as the minimum scan cycle, a smallest scan cycle among scan cycles contained in the plurality of pieces of geofence-related information.

According to an embodiment, the determining at least one channel may include, when the received geofence-related information is a plurality of pieces of geofence-related information, determining the at least one channel based on a common channel contained in the plurality of pieces of geofence-related information.

According to an embodiment, the scan function may include a scan function performed based on a 2.4 GHz band and/or a 5 GHz band corresponding to wireless local area network (WLAN) communication, and the determining at least one channel may include determining the at least one channel based on the 2.4 GHz band, or determine the at least one channel by combining the 2.4 GHz band and/or the 5 GHz band.

While the disclosure has been particularly shown and described with reference to exemplary embodiments thereof, it will be understood by those skilled in the art that various changes in form and details may be made therein without departing from the scope of the subject matter as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a wireless communication circuit configured to communicate with a wireless local area network (WLAN);
   a processor operatively connected to the wireless communication circuit; and
   a memory operatively connected to the wireless communication circuit and the processor,
   wherein the memory stores instructions causing, when executed by the processor, the processor to:
   receive geofence-related information from a server in response to execution of an application associated with a geofencing service,
   determine a minimum scan cycle based on the received geofence-related information,
   identify status information of the electronic device,
   identify power consumption required for performing a scan function, based on a residual battery level contained in the status information of the electronic device and the determined minimum scan cycle,
   determine at least one channel and a scan cycle based on the identified power consumption, and
   perform a scan function based on the determined at least one channel and the scan cycle.

2. The electronic device of claim 1, wherein the instructions cause the processor to:
   detect a geofencing event by performing the scan function corresponding to the at least one channel; and
   perform the geofencing service corresponding to the detected geofencing event.

3. The electronic device of claim 2, wherein the geofencing event includes an entry event indicating that the electronic device enters a geofencing area, or an exit event indicating that the electronic device exits the geofencing area.

4. The electronic device of claim 1, wherein the instructions cause the processor to:
   identify a scan power allowance consumed per hour when performing the scan function; and
   determine the at least one channel within a range satisfying the scan power allowance.

5. The electronic device of claim 1, wherein the instructions cause the processor to:
   when the received geofence-related information is a plurality of pieces of geofence-related information, determine, as the minimum scan cycle, a smallest scan cycle among scan cycles contained in the plurality of pieces of geofence-related information.

6. The electronic device of claim 1, wherein the instructions cause the processor to:
   when the received geofence-related information is a plurality of pieces of geofence-related information, determine the at least one channel based on a common channel contained in the plurality of pieces of geofence-related information.

7. The electronic device of claim 1, wherein the instructions cause the processor to:
   determine the at least one channel based on a frequency band corresponding to the WLAN or characteristics of the frequency band.

8. The electronic device of claim 7, wherein the frequency band corresponding to the WLAN includes a 2.4 GHz band and a 5 GHz band, and
   wherein the instructions cause the processor to:
   determine the at least one channel based on the 2.4 GHz band,
   determine the at least one channel by combining the 2.4 GHz band and the 5 GHz band, or
   determine the at least one channel except for a dynamic frequency selection (DFS) channel corresponding to the 5 GHz band.

9. The electronic device of claim 8, wherein the instructions cause the processor to:
   determine the at least one channel by preferentially selecting a channel corresponding to the 2.4 GHz band between the 2.4 GHz band and the 5 GHz band.

10. The electronic device of claim 1, wherein the geofence-related information includes location information of a geofencing area, basic service set ID (BSSID) information of an access point (AP) located around the geofencing area, reference received signal strength indication (RSSI) information of the AP, channel information of the AP, range information about the geofencing area, type information about a geofencing event, or information about geofencing service allowance latency.

11. An electronic device comprising:
    a wireless communication circuit configured to communicate with a wireless local area network (WLAN);
    a processor operatively connected to the wireless communication circuit; and
    a memory operatively connected to the processor,
    wherein the memory stores instructions causing, when executed, the processor to:
    detect a scan function performed for at least one channel, in response to detecting, identify whether the scan function is related to a geofencing service, determine at least one channel and a scan cycle when the scan function is related to the geofencing service, and perform the scan function through the wireless communication circuit, at least in part, based on the determined at least one channel and the scan cycle.

12. The electronic device of claim 11, wherein the instructions cause the processor to:

determine the at least one channel, based on a time required for performing the scan function.

13. A method for operating an electronic device, the method comprising:

receiving geofence-related information from a server in response to execution of an application associated with a geofencing service;

determining a minimum scan cycle based on the received geofence-related information;

identifying status information of the electronic device;

identifying power consumption required for performing a scan function, based on a residual battery level contained in the status information of the electronic device and the determined minimum scan cycle;

determining at least one channel and a scan cycle based on the identified power consumption; and performing a scan function based on the determined at least one channel and the scan cycle.

14. The method of claim 13, further comprising:

detecting a geofencing event by performing the scan function corresponding to the at least one channel; and performing the geofencing service corresponding to the detected geofencing event, wherein the geofencing event includes an entry event indicating that the electronic device enters a geofencing area, or an exit event indicating that the electronic device exits the geofencing area.

15. The method of claim 13, wherein determining at least one channel includes:

identifying a scan power allowance consumed per hour when performing the scan function; and determining the at least one channel within a range satisfying the scan power allowance.

16. The method of claim 13, wherein the determining a minimum scan cycle includes:

when the received geofence-related information is a plurality of pieces of geofence-related information, determining, as the minimum scan cycle, a smallest scan cycle among scan cycles contained in the plurality of pieces of geofence-related information.

17. The method of claim 13, wherein determining at least one channel includes:

when the received geofence-related information is a plurality of pieces of geofence-related information, determining the at least one channel based on a common channel contained in the plurality of pieces of geofence-related information.

18. The method of claim 13, wherein the scan function includes a scan function performed based on a 2.4 GHz band or a 5 GHz band corresponding to wireless local area network (WLAN) communication, and wherein determining at least one channel includes:

determining the at least one channel based on the 2.4 GHz band, or determining the at least one channel by combining the 2.4 GHz band and the 5 GHz band.

* * * * *